United States Patent
Zhang et al.

(10) Patent No.: US 11,057,790 B2
(45) Date of Patent: *Jul. 6, 2021

(54) UE BEAM MANAGEMENT: A COMBINED PERIODIC AND EVENT-BASED REPORT APPROACH FOR TRAFFIC OVERHEAD AND UE MOBILITY TRADEOFF

(71) Applicant: Apple Inc., Cupertino, CA (US)

(72) Inventors: Wei Zhang, Santa Clara, CA (US); Tianyan Pu, Cupertino, CA (US); Yang Li, Santa Clara, CA (US); Haitong Sun, Cupertino, CA (US); Wei Zeng, Saratoga, CA (US); Jia Tang, San Jose, CA (US); Beibei Wang, San Jose, CA (US); Sami M. Almalfouh, San Jose, CA (US); Zhu Ji, Cupertino, CA (US); Johnson O. Sebeni, Fremont, CA (US); Yuchul Kim, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,008

(22) Filed: Jul. 21, 2020

(65) Prior Publication Data
US 2020/0351695 A1   Nov. 5, 2020

Related U.S. Application Data

(63) Continuation of application No. 16/718,418, filed on Dec. 18, 2019, now Pat. No. 10,750,398, which is a
(Continued)

(51) Int. Cl.
*H04L 5/00*   (2006.01)
*H04W 24/10*   (2009.01)
(Continued)

(52) U.S. Cl.
CPC .......... *H04W 24/10* (2013.01); *H04B 7/0695* (2013.01); *H04B 7/082* (2013.01);
(Continued)

(58) Field of Classification Search
CPC ... H04W 72/046; H04W 24/10; H04W 88/02; H04W 24/08; H04W 72/042;
(Continued)

(56) References Cited

U.S. PATENT DOCUMENTS 10,098,030 B2    10/2018  Miao et al.
10,548,043 B2 *   1/2020  Zhang ................ H04W 72/042
(Continued)

OTHER PUBLICATIONS

Intel Corporation; Details for DL Beam Management; 3GPP Draft; RI-1710526; 3rd Generation Partnership Project (3GPP), Mobile Competence Centre; 650, Route Des Lucioles; F-06921 Sophia-Antipolis Cedex; France; vol. RAN WG1, No. Qingdao, China; Jun. 26, 2017; 13 pages.
(Continued)

*Primary Examiner* — Rahel Guarino
(74) *Attorney, Agent, or Firm* — Kowert, Hood, Munyon, Rankin & Goetzel, P.C.

(57) ABSTRACT

Apparatuses, systems, and methods for a wireless device to perform a method including performing one or more of periodic beam quality measurements and/or event-based beam quality measurements, determining, based at least in part on one or more of the periodic beam quality measurements and/or the event-based beam quality measurements, a recommended beam quality measurement configuration, and transmitting, to a base station serving the UE, the recommended beam quality measurement configuration. In addition, the UE may perform receiving, from the base station, instructions regarding the beam quality measurement configuration. The instructions may include instructions to activate, deactivate, and/or modify at least one beam quality
(Continued)

measurement configuration. In addition, the instructions may be based, at least in part, on the recommended beam quality measurement configuration.

20 Claims, 14 Drawing Sheets

Related U.S. Application Data continuation of application No. 16/145,462, filed on Sep. 28, 2018, now Pat. No. 10,548,043.

(60) Provisional application No. 62/584,644, filed on Nov. 10, 2017, provisional application No. 62/587,223, filed on Nov. 16, 2017.

(51) Int. Cl.
| | | |
|---|---|---|
| *H04B 7/08* | (2006.01) | |
| *H04B 7/06* | (2006.01) | |
| *H04W 72/08* | (2009.01) | |
| *H04W 24/08* | (2009.01) | |
| *H04W 72/04* | (2009.01) | |
| *H04W 88/02* | (2009.01) | |

(52) U.S. Cl.
CPC ............... *H04B 7/088* (2013.01); *H04L 5/00* (2013.01); *H04W 24/08* (2013.01); *H04W 72/042* (2013.01); *H04W 72/085* (2013.01); *H04B 7/0814* (2013.01); *H04B 7/0834* (2013.01); *H04W 72/046* (2013.01); *H04W 88/02* (2013.01)

(58) Field of Classification Search
CPC ............... H04W 72/085; H04W 76/27; H04W 72/1215; H04B 7/0695; H04B 7/088; H04B 7/082; H04B 17/309; H04B 7/0408; H04B 7/0814; H04B 7/0834; H04L 5/0048; H04L 5/00
See application file for complete search history.

(56) References Cited

U.S. PATENT DOCUMENTS

| | | |
|---|---|---|
| 2013/0121185 A1 | 5/2013 | Li et al. |
| 2017/0214444 A1 | 7/2017 | Nigam et al. |
| 2017/0230849 A1* | 8/2017 | Wei ........................ H04L 5/0023 |
| 2018/0212651 A1 | 7/2018 | Li et al. |
| 2019/0053072 A1* | 2/2019 | Kundargi ............. H04B 7/0814 |

OTHER PUBLICATIONS

LG Electronics; "Discussion on beam failure recovery"; 3GPP Draft; RI-1707606; 3rd Generation Partnership Project (3GPP), Mobile Competence Centre; 650, Route Des Lucioles ; F-06921 Sophia-Antipolis Cedex; France; vol. RAN WG1, No. Hangzhou, China; May 14, 2017; five pages.
International Search Report and Written Opinion, Application No. PCT/US2018/060103, dated Mar. 19, 2019, 17 pages.
3GPP TSG RAN WG1 NR Ad Hoc Meeting; R1-1711636; Huawei, HiSilicon; "General views on DL beam management"; R1-1711636; Jun. 27-30, 2017; GPP TSG RAN WG1 NR Ad Hoc Meeting; Qingdao, China; 12 pages.

* cited by examiner

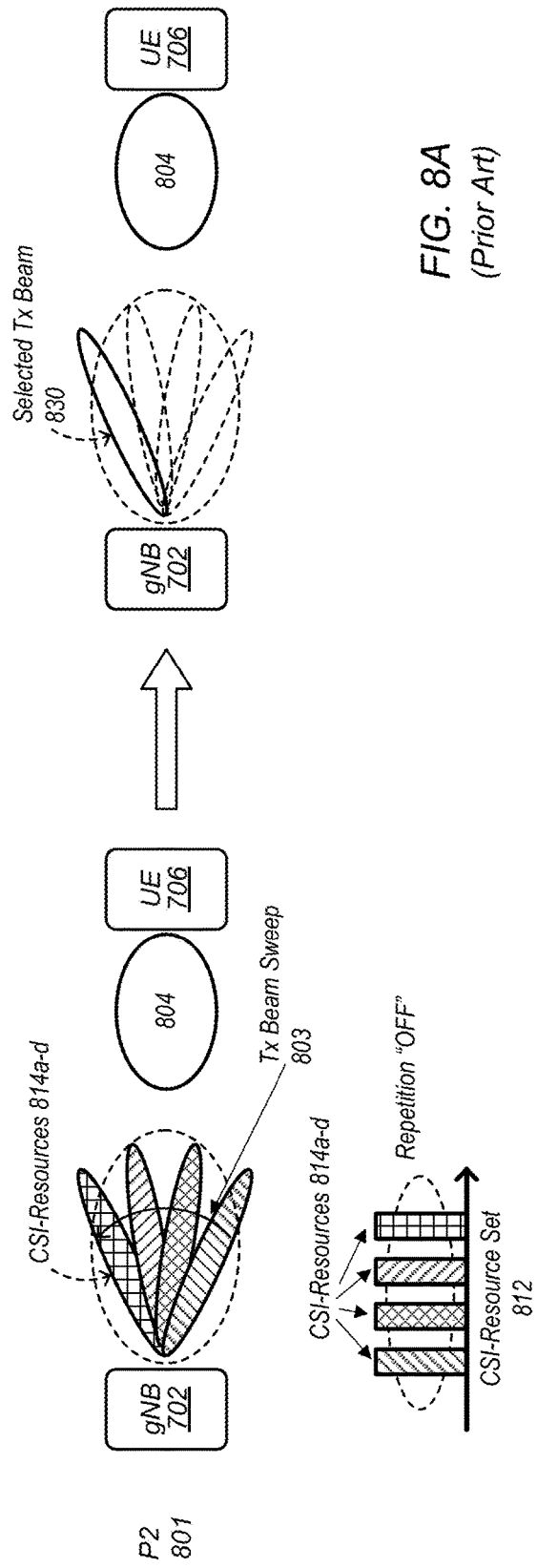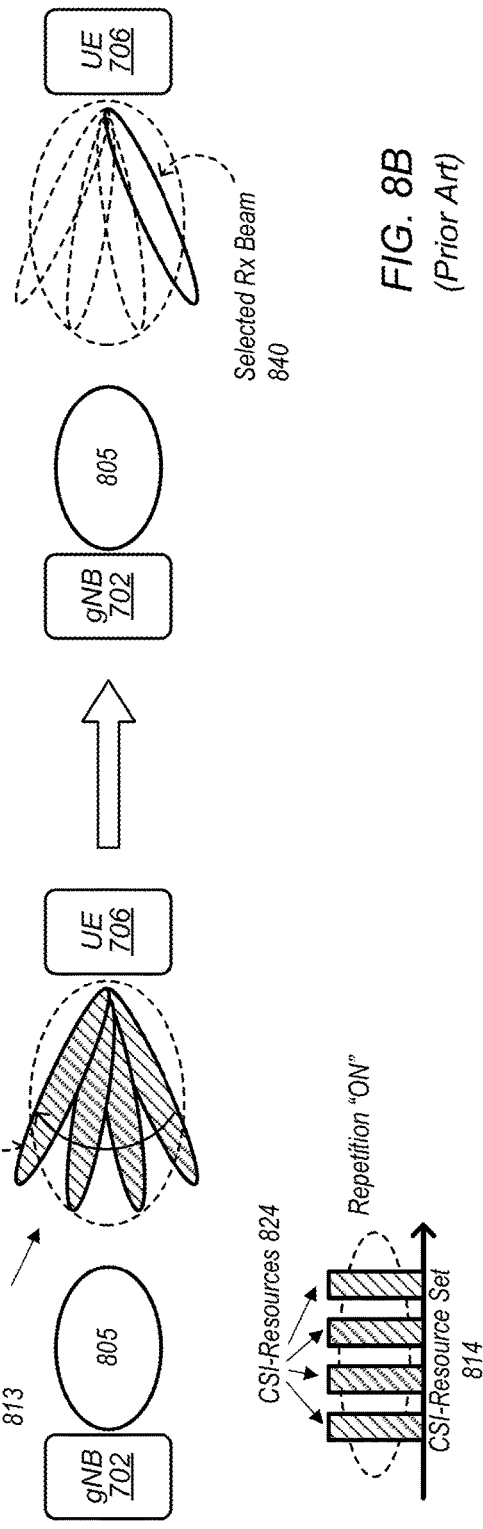
FIG. 8A (Prior Art)
FIG. 8B (Prior Art)

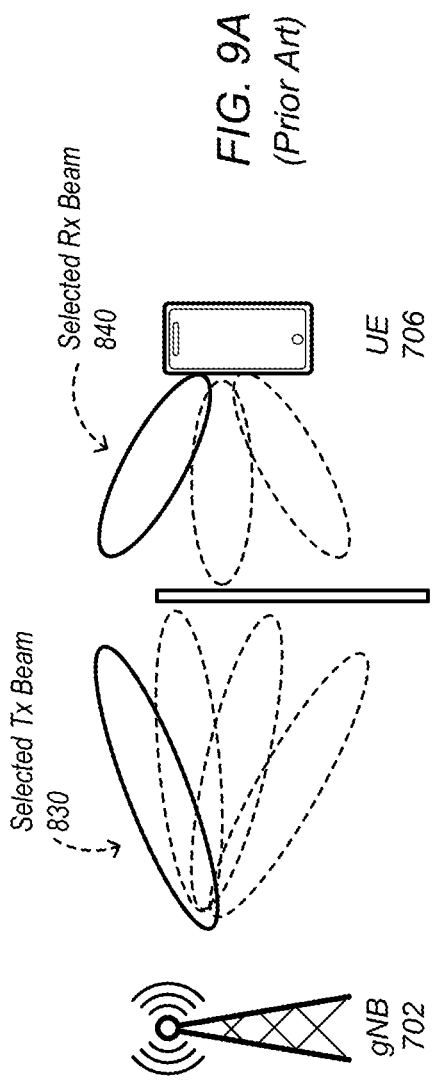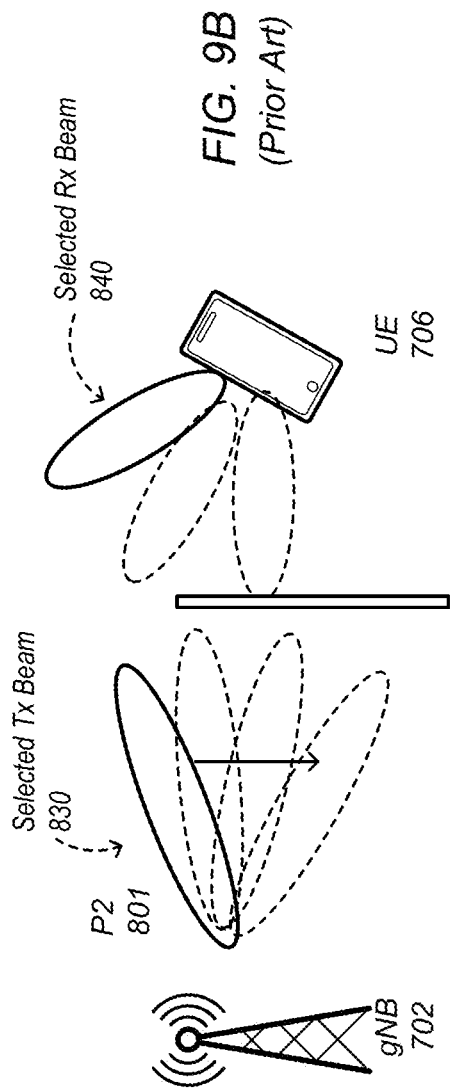
FIG. 9A (Prior Art)
FIG. 9B (Prior Art)

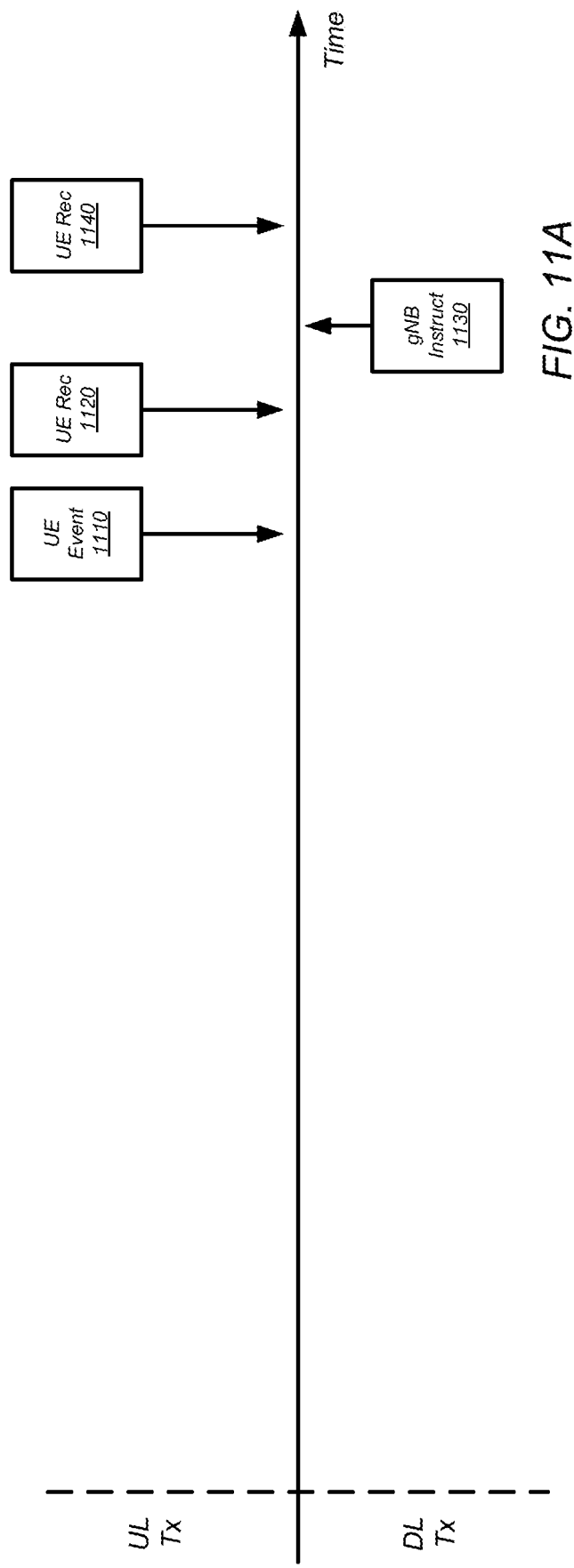

UE BEAM MANAGEMENT: A COMBINED PERIODIC AND EVENT-BASED REPORT APPROACH FOR TRAFFIC OVERHEAD AND UE MOBILITY TRADEOFF

PRIORITY DATA

This application is a continuation of U.S. patent application Ser. No. 16/718,418, filed Dec. 18, 2019, titled "UE Beam Management: A Combined Periodic and Event-based Report Approach for Traffic Overhead and UE Mobility Tradeoff", which is a continuation of U.S. patent application Ser. No. 16/145,462, filed Sep. 28, 2018, titled "UE Beam Management: A Combined Periodic and Event-based Report Approach for Traffic Overhead and UE Mobility Tradeoff", which claims benefit of priority to U.S. Provisional Application Ser. No. 62/584,644, titled "UE Beam Management: A Combined Periodic and Event-based Report Approach for Traffic Overhead and UE Mobility Tradeoff", filed Nov. 10, 2017, and to U.S. Provisional Application Ser. No. 62/587,223, titled "UE Beam Management: A Combined Periodic and Event-based Report Approach for Traffic Overhead and UE Mobility Tradeoff", filed Nov. 16, 2017, each of which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD

The present application relates to wireless devices, and more particularly to apparatus, systems, and methods for a wireless device to initiate beam management procedures for next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform beam management procedures of a wireless device and a next generation network node (e.g., a fifth generation new radio (5G NR) network node also called a gNB).

In some embodiments, a user equipment device may be configured to perform a method including performing one or more of periodic beam quality measurements and/or event-based beam quality measurements, determining, based at least in part on one or more of the periodic beam quality measurements and/or the event-based beam quality measurements, a recommended beam quality measurement configuration, and transmitting, to a base station serving the UE, the recommended beam quality measurement configuration.

In addition, the UE may perform receiving, from the base station, instructions regarding the beam quality measurement configuration. The instructions may include instructions to activate, deactivate, and/or modify at least one beam quality measurement configuration. In addition, the instructions may be based, at least in part, on the recommended beam quality measurement configuration.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 8A illustrates an example of a P2 beam management procedure.

FIG. 8B illustrates an example of a P3 beam management procedure.

FIGS. 9A and 9B illustrate an example of effects of motion of a UE on beam selection.

FIG. 11A illustrates an example of event-based beam management with UE feedback, according to some embodiments.

FIG. 11B illustrates an example of RRC measurement event configurations for event-based beam quality reports, according to some embodiments.

Figure 1:
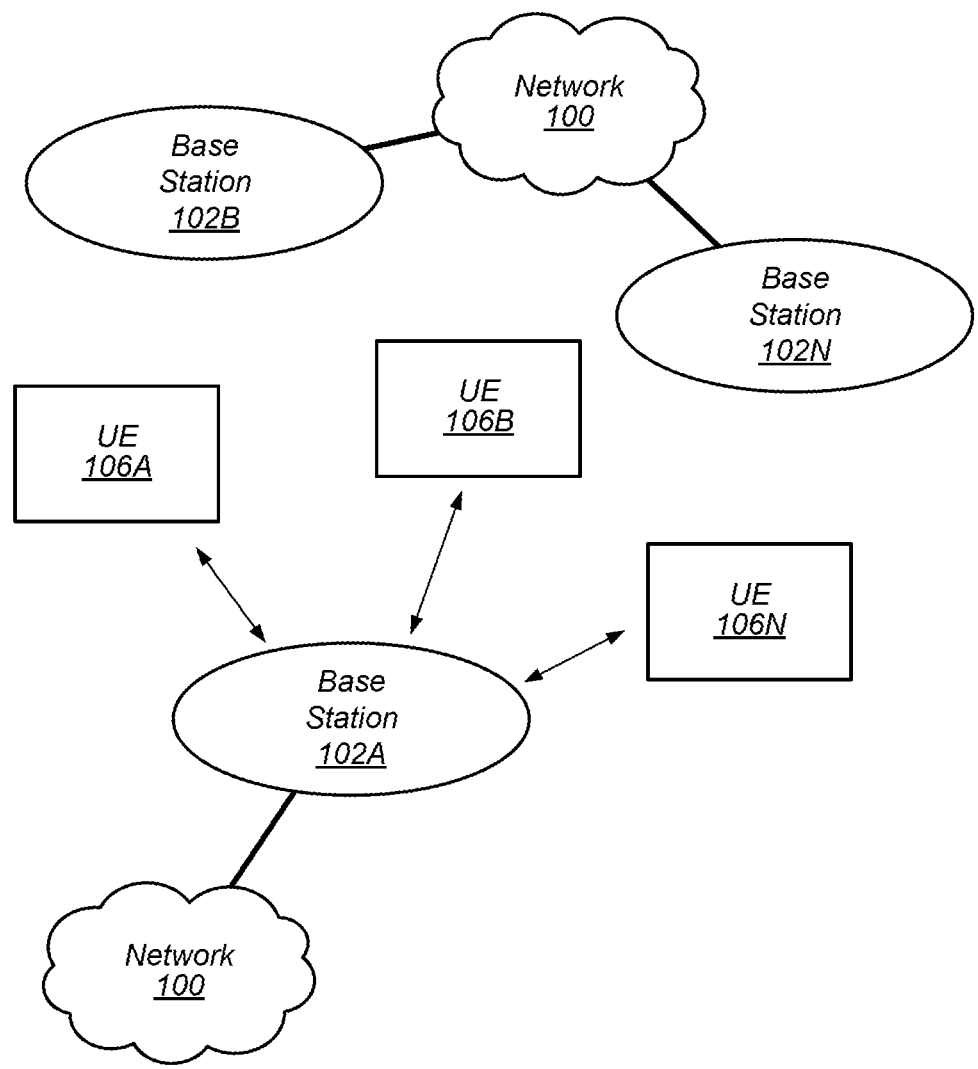
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
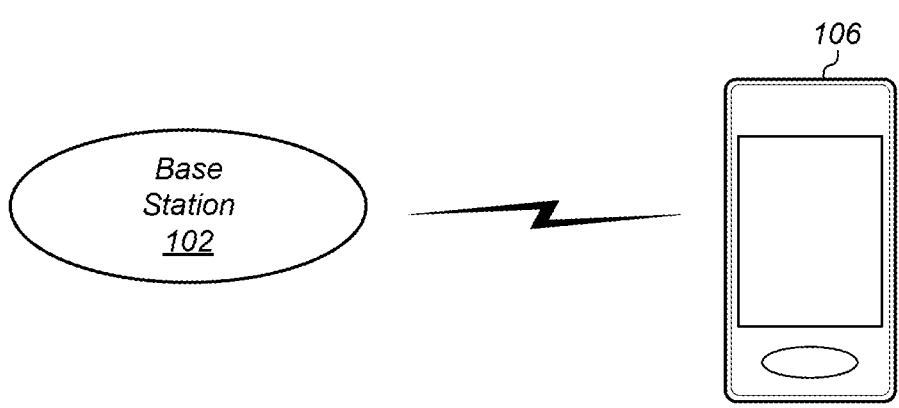
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
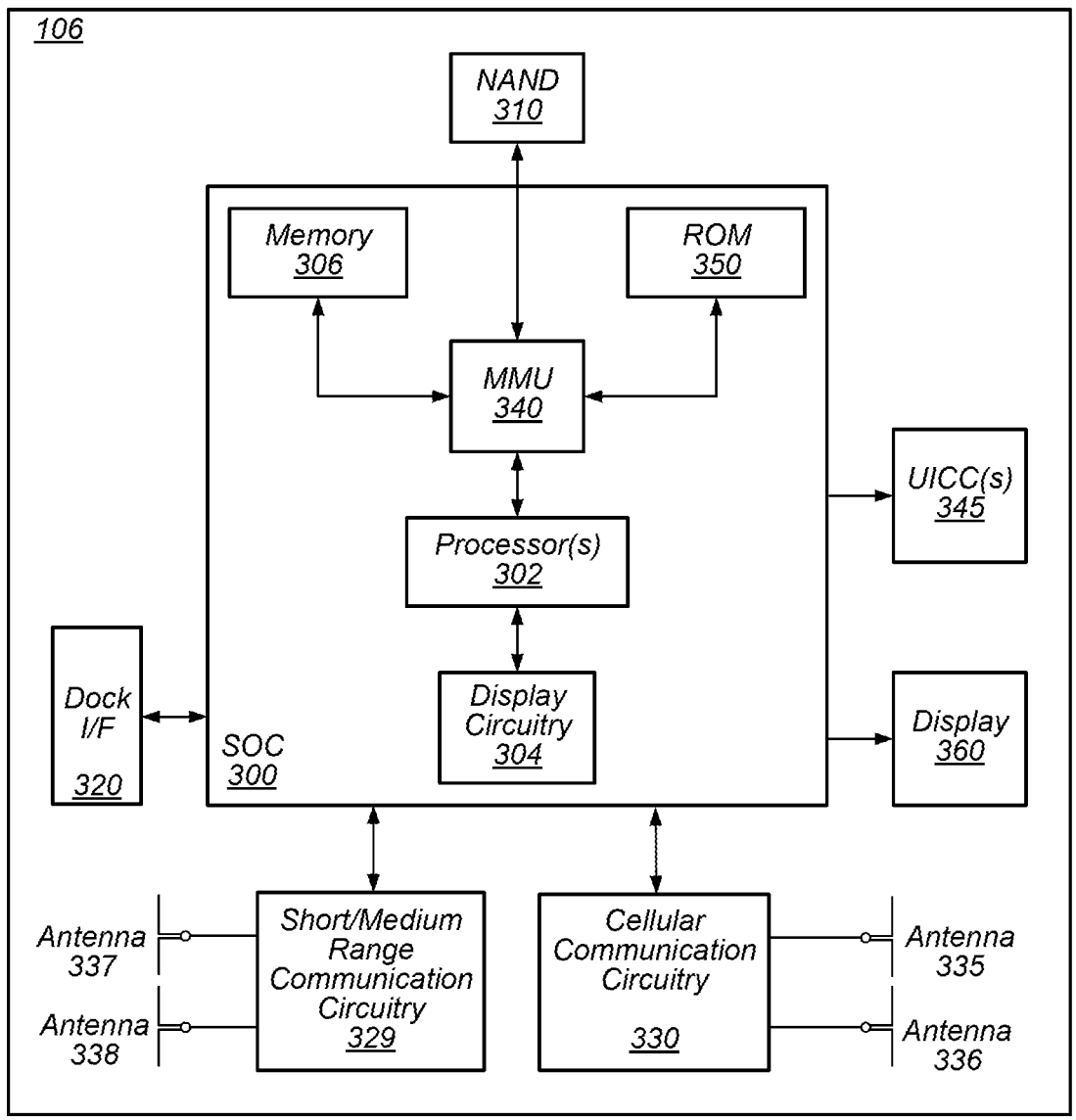
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including performing one or more of periodic beam quality measurements and/or event-based beam quality measurements, determining, based at least in part on one or more of the periodic beam quality measurements and/or the event-based beam quality measurements, a recommended beam quality measurement configuration, and transmitting, to a base station serving the UE, the recommended beam quality measurement configuration. In addition, the UE may perform receiving, from the base station, instructions regarding the beam quality measurement configuration. The instructions may include instructions to activate, deactivate, and/or modify at least one beam quality measurement configuration. In addition, the instructions may be based, at least in part, on the recommended beam quality measurement configuration.

As described herein, the communication device 106 may include hardware and software components for implementing the above features for recommending a beam quality measurement configuration. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
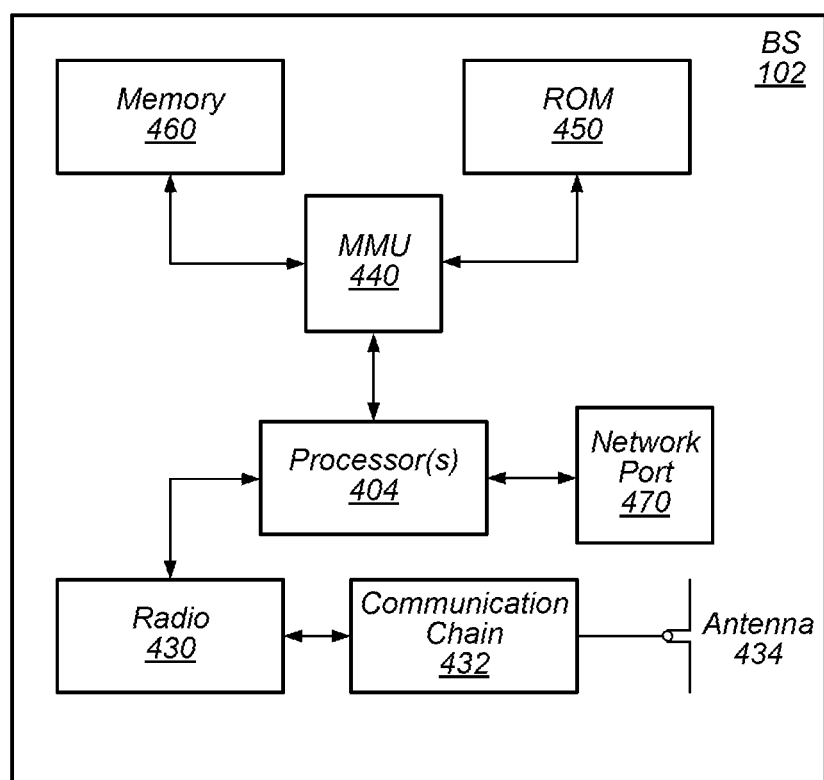
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
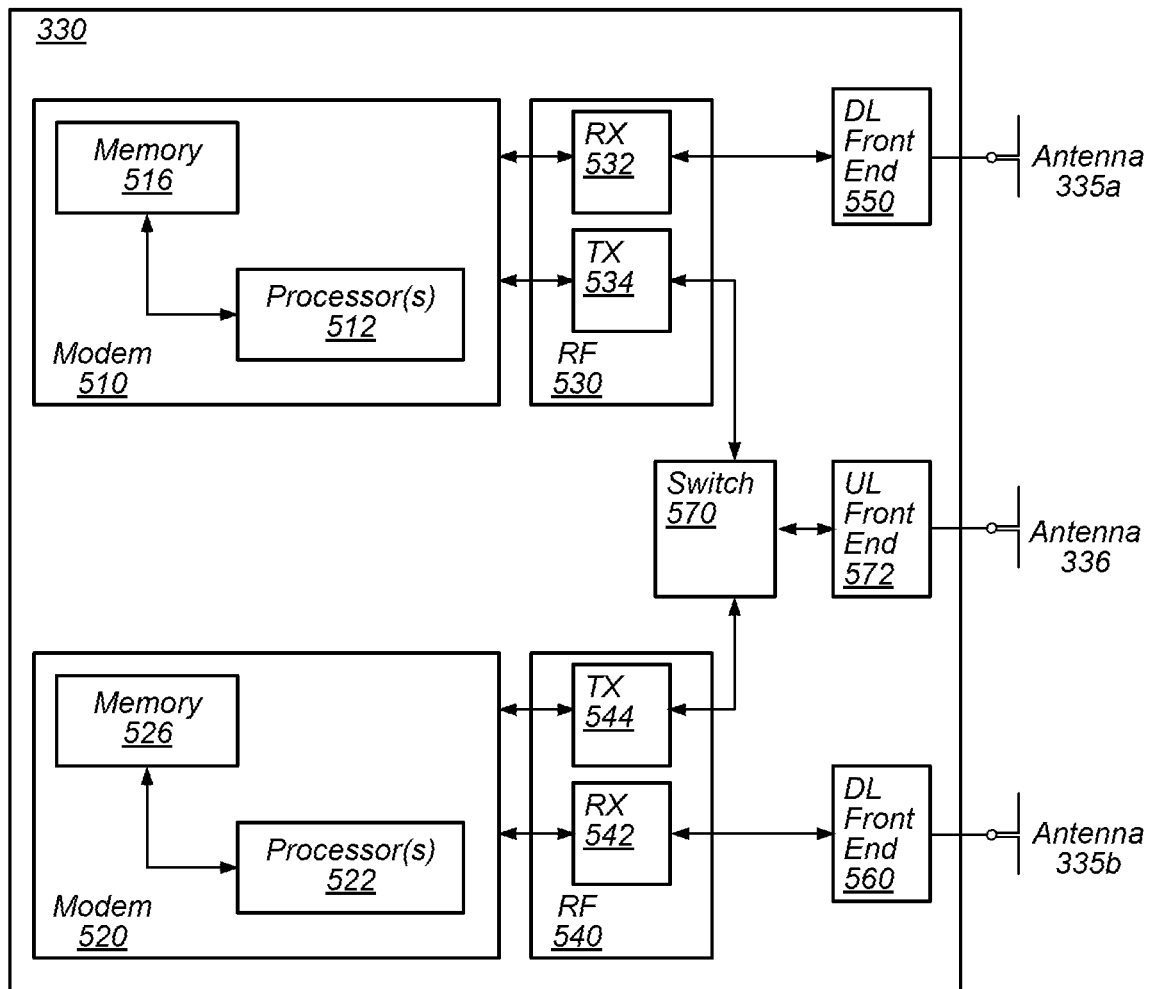
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform a method including performing one or more of periodic beam quality measurements and/or event-based beam quality measurements, determining, based at least in part on one or more of the periodic beam quality measurements and/or the event-based beam quality measurements, a recommended beam quality measurement configuration, and transmitting, to a base station serving the UE, the recommended beam quality measurement configuration. In addition, the UE may perform receiving, from the base station, instructions regarding the beam quality measurement configuration. The instructions may include instructions to activate, deactivate, and/or modify at least one beam quality measurement configuration. In addition, the instructions may be based, at least in part, on the recommended beam quality measurement configuration.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for recommending a beam quality measurement configuration, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
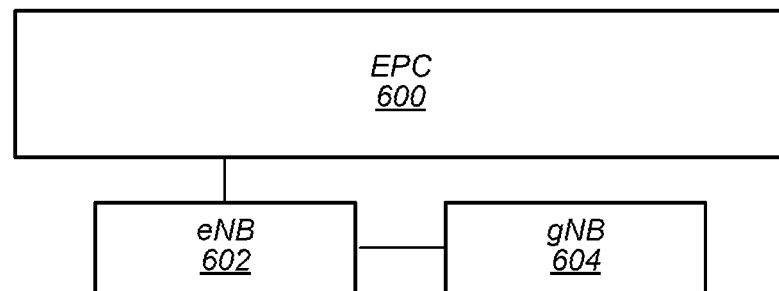
FIG. 6A illustrates an example of connections between an EPC network, an LTE base station (eNB), and a 5G NR base station (gNB).
Figure 6B:
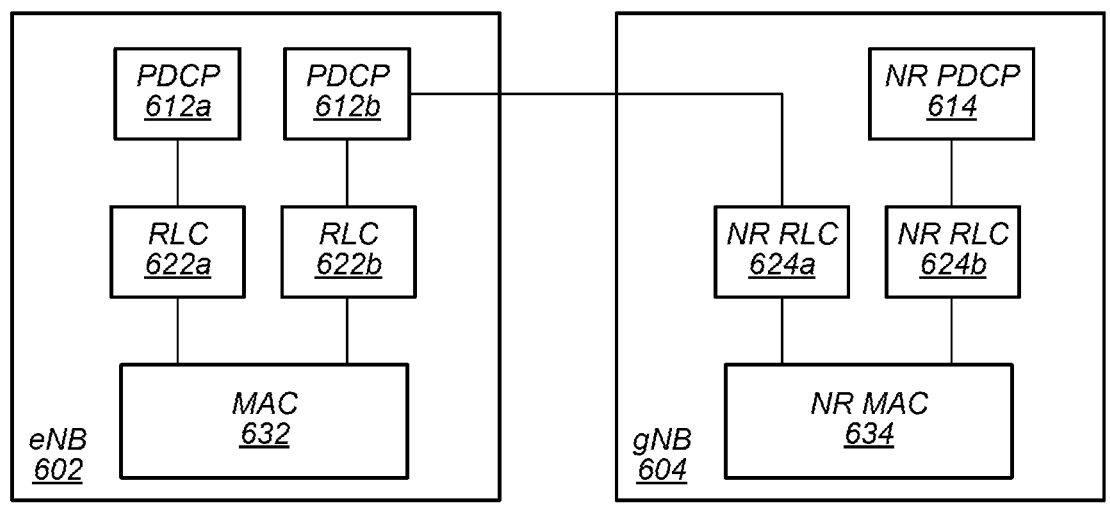
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 622b of eNB 602 via an X2 interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Beam Management

In current implementation of the 5G New Radio (5G NR), the beam management framework includes a new radio base station (e.g., a "gNB") transmitting periodic beam management channel state information (CSI) to a user equipment device ("UE") and the UE measuring and reporting reference signal received power (RSRP) of selected beams. The gNB may monitor any beam degradation and trigger various beam management procedures, e.g., reselection of a beam at the gNB and/or reselection of a beam at the UE.

Figure 7:
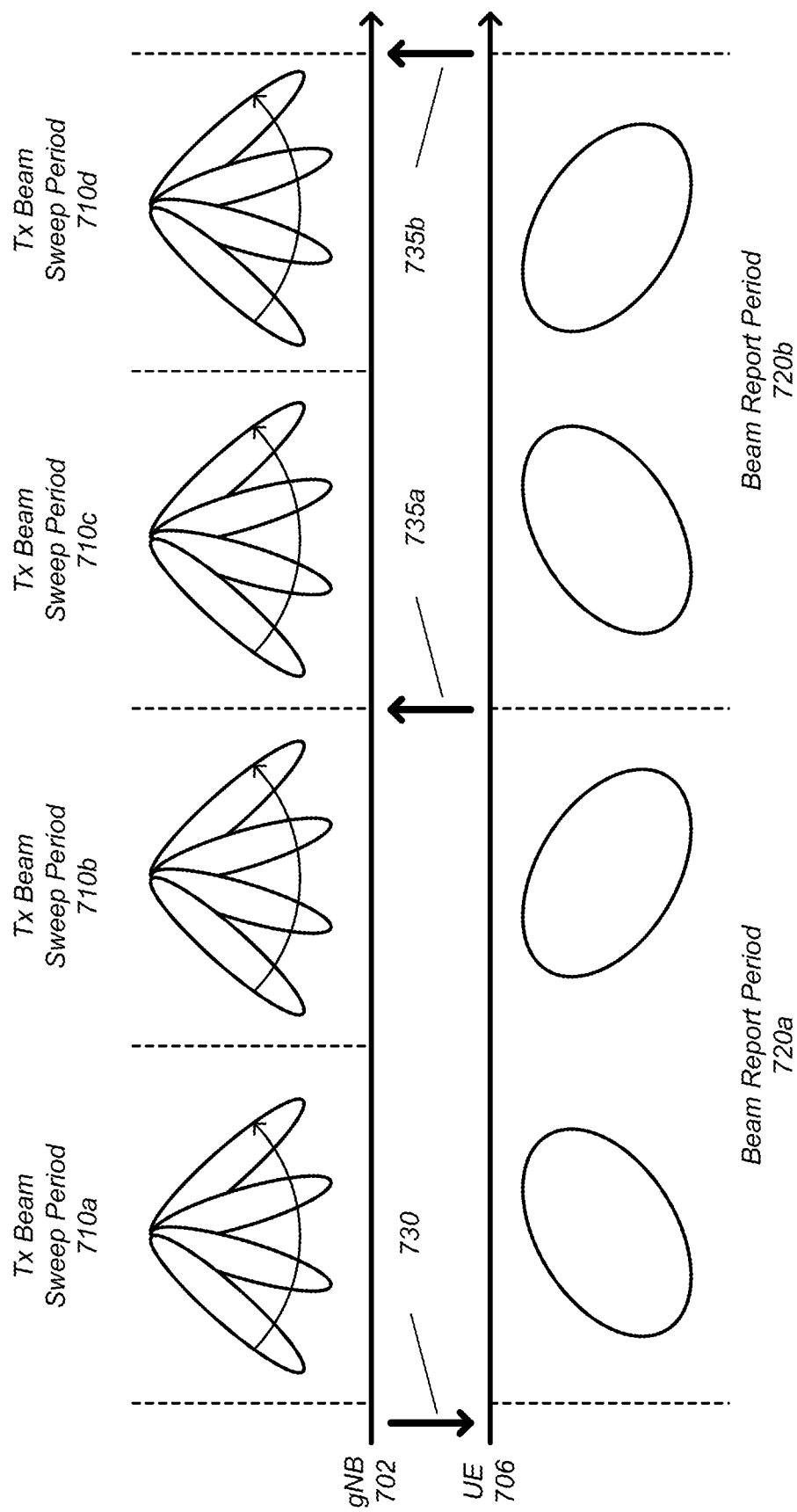
FIG. 7 illustrates an example of operation of a beam management framework.

For example, FIG. 7 illustrates an example of operation of a beam management framework. As shown, a gNB 702 may periodically or routinely transmit beam management channel state information (CSI) to a user equipment device, such as UE 706. Beam management CSI may include reference signals (RS) such as periodic CSI-RS (P-CSI-RS), semi-persistent CSI-RS (SP-CSI-RS), and/or synchronization signal blocks (SSBs), among other types of reference symbols. The UE 706 may monitor/measure the RSRP of the beam(s) and may report the RSRP to the gNB 702. The gNB 702 may monitor beam degradation, e.g., based on the reported RSRP and based on detecting beam degradation, the gNB 702 may trigger beam management procedures, including aperiodic beam management procedures (such as P2/P3, discussed below). In some instances, the beam management procedures may be triggered if beam management CSI is not sufficient to avoid degradation (e.g., beyond a threshold). Such aperiodic beam management procedures may be UE-specific, e.g., in order to avoid the potentially extensive resource cost of doing so for UEs generally. As illustrated by FIG. 7, during an exemplary beam management procedure, the gNB 702 may transmit a series of beams (e.g., Tx beam) in a sweep (or a series of sweeps), such as TX beam sweep periods 710a-d, and may transmit RRC configuration information 730 relevant to beam management. The UE 706 may detect one or more of the beams, may measure the strength (e.g., RSRP) or other characteristics of the beam(s), and may provide one or more reports 735a-b to the gNB 702 based on the detection(s) and/or measurement(s).

As a further example, FIGS. 8A-B illustrate respective beam management procedures, known as P2 and P3. Turning to FIG. 8A, a beam management procedure known as P2 includes a gNB, such as gNB 702, transmitting a series (e.g., a sweep) of beams 803, e.g., narrow beams at different angles using a set of CSI resources 814a-d (CSI resource set or CRS). As shown, a specific CSI resource may correspond to each beam so that each beam uses a different CSI resource, so that the total group of beams uses a specific CRS. For example, a CRS resource set 812 including four resources 814a-d may be used for P2, such that a different resource is used for each of four beams. In other words, the CRS may not be repeated, e.g., repetition is off. A receiving UE 706 may use a single, broad receive (e.g., Rx) beam 804 during the sweep. Based on reports provided by the UE 706, the gNB 702 may select a Tx beam 830.

Turning to FIG. 8B, in contrast to P2, a beam management procedure known as P3 includes a UE, such as UE 706, performing a sweep of Rx beams 813 while the gNB 702 transmits a constant, broad Tx beam 805. The gNB 702 may use a single CSI resource set during the sweep 813, e.g., repetition may be on. The CRS may include a single resource 824, or multiple resources (e.g., in some instances, the CRS used for P3 may include five resources). Based on the measurements (e.g., RSRP) of the Tx beam 805 using the different Rx beams, the UE may select an Rx beam 840.

It will be appreciated that other, e.g., not illustrated herein, beam management procedures are known, including at least P1, U1, U2, and U3. P1 may include concurrent sweeps of both the gNB (e.g., Tx beam) and UE (e.g., Rx). U1, U2, and U3, may correspond to the P1, P2, and P3 procedures, except that the roles may be reversed, e.g., the UE may transmit a Tx beam and the gNB may receive with an Rx beam.

In addition to general signal degradation requiring beam management procedures, motion of a UE may impact beam quality and/or beam selection. FIGS. 9A and 9B illustrate an example of effects of motion of a UE on beam selection. For example, as illustrated by FIG. 9A, the UE 706 and the gNB 702 may use a first pair of Tx and Rx beams 830 and 840, respectively, while the UE 706 is in a first location or orientation. The first pair may result in good channel quality (e.g., high RSRP) given the communication environment. As shown, the selected beams may avoid certain obstacles and may include reflection from objects to achieve a communicative path. Turning to FIG. 9B, illustrated is an instance in which the UE 706 may have moved or rotated and, as a result, the first pair of Tx and Rx beams 830 and 840 may no longer result in good channel quality. The change in the UE 706's position or orientation relative to the communication environment may lead to degradation of the channel when using the first pair of Tx and Rx beams 830 and 840. Thus, based on the motion of the UE, selection of a new pair of beams may be desirable.

Various observations may be appreciated. The behavior of a base station (e.g., eNB or gNB) may be predictable to a UE. For example, a gNB may transmit SSB and/or CSI on a known (e.g., periodic) schedule. Changes in a desirable beam (e.g., pair of Tx and Rx beams) may result from changes at the UE, such as movement, rotation, or blockage (e.g., a user's hand or body, or other surrounding objects), etc. The UE may thus know better than a gNB what actions may be taken to mitigate such changes. For example, the UE may use radio measurements and/or other sensors (e.g., accelerometers, GNSS circuitry) to detect changes that may implicate selection of a new beam pair. The gNB, in contrast, may only be able to detect degradation, and not the factors leading to the degradation. Thus, the UE may be better able to determine the cause of degradation and select an appropriate response. However, current as shown, current beam management approaches may not support signaling/reporting from a UE to assist beam management procedures (e.g., to initiate P2 vs P3). Accordingly, the gNB 702 may rely on trial and error selection of beam management procedures, which may incur costs of power, resources, and delay. For example, in the case of UE as illustrated in rotation FIGS. 9A-B, the gNB 702 may detect RSRP drop (e.g., from a report from the UE 706) and may trigger a P2 beam management procedure 801, although P3 may provide better likelihood of rapidly selecting an appropriate beam pair.

Thus, as popularity of beam forming in the development of 5G NR has increased, UE feedback of beam quality has become of increasing interest. In particular, periodic beam quality reports from the UE have been agreed upon for up to a maximum number of signaled beams. However, for a periodic beam reporting scheme, traffic overhead and link reliability benefits may need to be balanced, including, for example, adjustment of report periodicity and/or measurement periodicity as well as perhaps channel state information—reference signal (CSI-RS) periodicity. In addition, for an event-based measurement reporting scheme, which has been shown to effectively maintain good mobility service for LTE/UMTS, a faster event report and action may be required as compared to LTE/UMTS due to the scale of measurement is smaller for beams.

Thus, in some embodiments, beam quality measurement reports from a user equipment device (UE), such as UE 106, may include (or be composed of) periodic beam quality reports and/or event-based reports (e.g., aperiodic beam measurement reports). In some embodiments, for a periodic beam quality measurement report, the UE may include (or have) a capability to feedback recommended beam quality measurement configurations, e.g., report periodicity. In other words, for a periodic beam quality measurement report, the UE (or a processor of the UE) may be configured to feedback recommended beam quality measurement configurations for beam management. In some embodiments, in response to the feedback, a base station, such as gNB 102 (and/or gNB 604) (and/or gNB 604), may modify, activate, and/or deactivate one or more beam quality measurement configurations. In other words, the base station may determine whether to modify, activate, and/or deactivate beam quality measurement configurations upon reception of UE feedback. In some embodiments, for an event-based beam quality report, the UE may optionally recommend certain (or particular) event reports to be activated. In other words, for an event-based beam quality report, the UE (or a processor of the UE) may be configured to determine whether to recommend particular event beam quality reports to be activated. In some embodiments, the UE may also reserve (or have) an option to recommend beam management action together with event beam quality report based on exterior information, e.g., from sensors on (or comprised within) the UE. In other words, a modem (or radio, or processor of a radio, e.g., cellular communication circuitry 330) of the UE may receive information regarding status of the UE, e.g., movement, rotation, blockage (e.g., of an antenna or beam) via an object proximate the UE (e.g., a hand or body or a user as well as structures). In some embodiments, in response to the recommendation, a base station, such as gNB 102 (and/or gNB 604), may modify, activate, and/or deactivate one or more beam quality measurement configurations. In other words, the base station may determine whether to modify, activate, and/or deactivate beam quality measurement configurations upon reception of the UE recommendation. In addition, in some embodiments, the base station may additionally or alternatively provide instructions for UE actions after receiving the UE recommendation.

In some embodiments, for periodic beam measurement configuration feedback, a preselected candidate set of periodic beam quality report configurations can be setup through radio resource control (RRC) signaling between a UE, such as UE 106, and a base station, such as gNB 102 (and/or gNB 604). In some embodiments, a beam quality measurement reference may be based (at last in part) on CSI-RS and/or synchronization signaling blocks (SSBs). Note that in some embodiments, at most one configuration may be active for each measurement reference (e.g., SSB or CSI-RS). In some embodiments, beam quality report size (e.g., long/middle/short report) and/or beam quality measurement periodicity can be configured via the RRC signaling between the UE and the base station. In some embodiments, default configurations may be signaled via the RRC signaling between the UE and the base station.

In some embodiments, the UE (or a radio/baseband processor of the UE, e.g., cellular communication circuitry 330) may be configured to (or have the capability to) feedback (transmit signaling, e.g., via RRC signaling, a medium access control (MAC) control element (CE), or a short subframe of a physical uplink control channel (PUCCH)) recommended beam quality measurement configurations to the base station. For example, based (at least in part) on information available at the UE (e.g., Doppler shift/spread, motion detection, change/trend of layer 1 (L1) RSRP), a periodicity may be selected from a preconfigured set (e.g., as configured via RRC signaling). Additionally, exterior information received at the radio (or baseband processor, e.g., cellular communication circuitry 330) of the UE from other sensors of the UE may be utilized to generate information such as motion/rotation detection that the UE may use to determine report periodicity. In some embodiments, the UE may feedback a recommended periodicity for a beam quality measurement reference (e.g., via a MAC CE) instead of (or as an alternative to) selecting from a signaled candidate set. In some embodiments, the base station may determine to activate and/or deactivate periodic beam quality measurement configurations based (at least in part) on the UE feedback. Note that in some embodiments, a beam quality measurement reference (e.g., CSI-RS and/or SSBs) may only have one periodic beam quality report configuration active at a given time. In other words, at any time, at most one periodic beam quality report configuration can be active for each beam quality measurement reference (e.g., CSI-RS and/or SSBs).

Figures 10A, 10B:
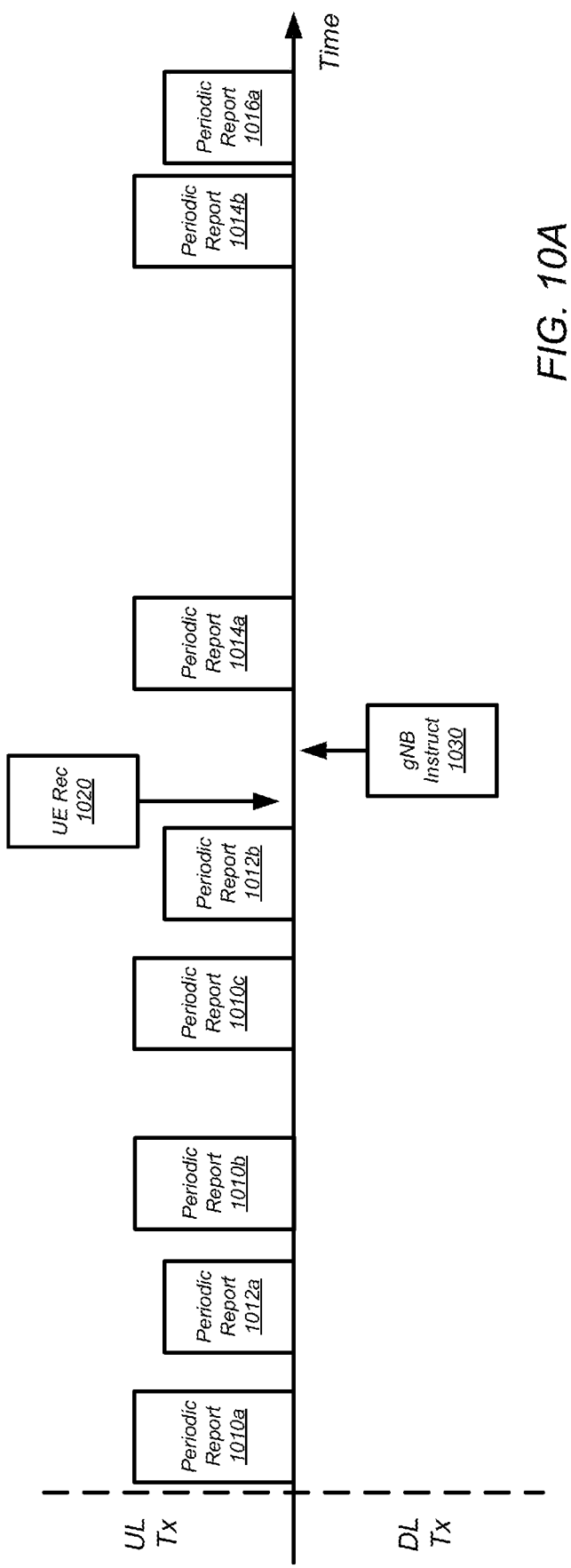
FIG. 10A illustrates an example of periodic beam management with UE feedback, according to some embodiments.
FIG. 10B illustrates an example of RRC measurement configurations for periodic beam quality reports, according to some embodiments.

For example, as illustrated by FIG. 10A, a UE, such as UE 106, may transmit (on an uplink transmission) periodic beam quality reports for beam quality measurement references CSI-RS (e.g., reports 1010a-c) and SSB (e.g., reports 1012a-b) using periodic beam quality report configurations 1.b and 2.b (e.g., as described by the table of FIG. 10B), respectively. In some embodiments, the beam quality report configurations may initially be signaled (e.g., via RRC signaling) from a base station. The UE may then recommend (e.g., via a MAC CE 1020) activating periodic beam quality report configurations 1.a and 2.a and/or recommend setup parameters associated with configurations 1.a and 2.a. In response, a base station, such as gNB 102 (and/or gNB 604), may determine (e.g., based, at least in part on the recommendation of the UE) to activate periodic beam quality report configurations 1.a and 2.a and deactivate periodic beam quality report configurations 1.b and 2.b, e.g., via a MAC CE 1030 transmitted to the UE on a downlink transmission and may transmit the indication of the activation and deactivation via the MAC CE 1030. Upon receiving the MAC CE 1030 from the base station, the UE may then transmit periodic beam quality reports for beam quality measurement references CSI-RS (e.g., reports 1014a-b) and SSB (e.g., report 1016a) using periodic beam quality report configurations 1.a and 2.a, respectively.

In some embodiments, for an event-based beam quality report (e.g., aperiodic beam quality reports), a UE, such as UE 106, may optionally recommend certain (or particular) event reports to be activated. In other words, for an event-based beam quality report, the UE (or a processor of the UE) may be configured to determine whether to recommend particular event beam quality reports to be activated. In some embodiments, a preselected (or preconfigured) candidate set of beam event beam quality report configurations may be setup (or initialized/configured) via RRC signaling between the UE and a base station, such as gNB 102 (and/or gNB 604). For example, a beam quality report configuration could be associated with a particular event. In addition, the particular event may be characterized by associated parameters. Thus, in some embodiments, a particular event may be associated with more than one beam quality report configuration based, at least in part, on the associated parameters. In some embodiments, the associated parameters may include, but may not be limited to, a trigger threshold and a time-to-trigger (TTI). In some embodiments, the UE (or a processor/radio of the UE, e.g., cellular communication circuitry 330) may be configured to feedback recommended event beam quality report configurations based, at least in part, on exterior information, e.g., from sensors on (or comprised within) the UE. In other words, a modem (or radio, or processor of a radio, e.g., cellular communication circuitry 330) of the UE may receive information regarding status of the UE, e.g., movement, rotation, blockage (e.g., of an antenna or beam) via an object proximate the UE (e.g., a hand or body or a user as well as structures) and the UE may base the recommendation on the received information. In some embodiments, the recommendation may be signaled via RRC signaling, a MAC CE, and/or a short PUCCH subframe. In some embodiments, in response to the recommendation, the base station may modify, activate, and/or deactivate one or more beam quality measurement configurations based, at least in part, on the recommendation. In other words, the base station may determine whether to modify, activate, and/or deactivate beam quality measurement configurations upon reception of the UE recommendation. Note that in some embodiments, in addition to considering the recommendation, the base station may also base the determination on other factors, such as channel quality (as measured by the base station) and/or periodic beam quality reports and/or recommendations received from the UE. In some embodiments, communication between the base station and UE may implicitly allow for an efficient response to UE mobility and/or avoid the UE's own manipulation of event report parameters at UE side. In addition, in some embodiments, the base station may additionally or alternatively provide instructions for UE actions after receiving the UE recommendation. In some embodiments, the UE may include recommended beam management action in the event report, e.g., based, at least in part, on the information regarding status of the UE. For example, the UE may recommend beam management actions such as (but not limited to) UE receiver beam sweep, UE transmitter beam sweep, base station transmitter beam sweep, base station receiver beam sweep, and/or any combination thereof.

For example, as illustrated by FIG. 11A, a UE, such as UE 106, may transmit (on an uplink transmission) an event report 1110 via RRC signaling to a base station, such as gNB 102 (and/or gNB 604). The event report may optionally include recommended actions. In addition, the UE may transmit a recommendation 1120 to activate event beam quality report configuration 3 (e.g., as described in FIG. 11B), e.g., via a MAC CE. Note that in some embodiments, there may not be a current (or active) event beam quality report configuration. In addition, note that in some embodiments, the recommendation (or settings related to a configuration and/or a set of parameters related to the configuration) may vary based, at least in part, on a measurement reference (e.g., SSB or CSI-RS). In response, the base station may determine (e.g., based, at least in part on the recommendation of the UE) to activate event beam quality report configuration 3 and may transmit an indication of the activation and deactivation via a MAC CE 1130. Upon receiving the MAC CE 1130 from the base station, the UE may then transmit a beam quality report using configuration 3. In addition, the UE may later report (via RRC signaling 1140) an occurrence of Event 3 and may optionally include recommended actions. FIG. 11B further illustrates measurement event configurations 1, 2, and 3, among other possible events. For example, event 1 may be associated with a first TTI (e.g., TTI 1) and a first threshold (e.g., threshold 1), event 2 may be associated with a second TTI (e.g., TTI 2) and a second threshold (e.g., threshold 2), and event 3 may be associated with a third TTI (e.g., TTI 3) and a third threshold (e.g., threshold 3). In addition, events 1 and 2 may be associated with (or have) an active status and event 3 may be associated with (or have) a non-active status.

Figure 12:
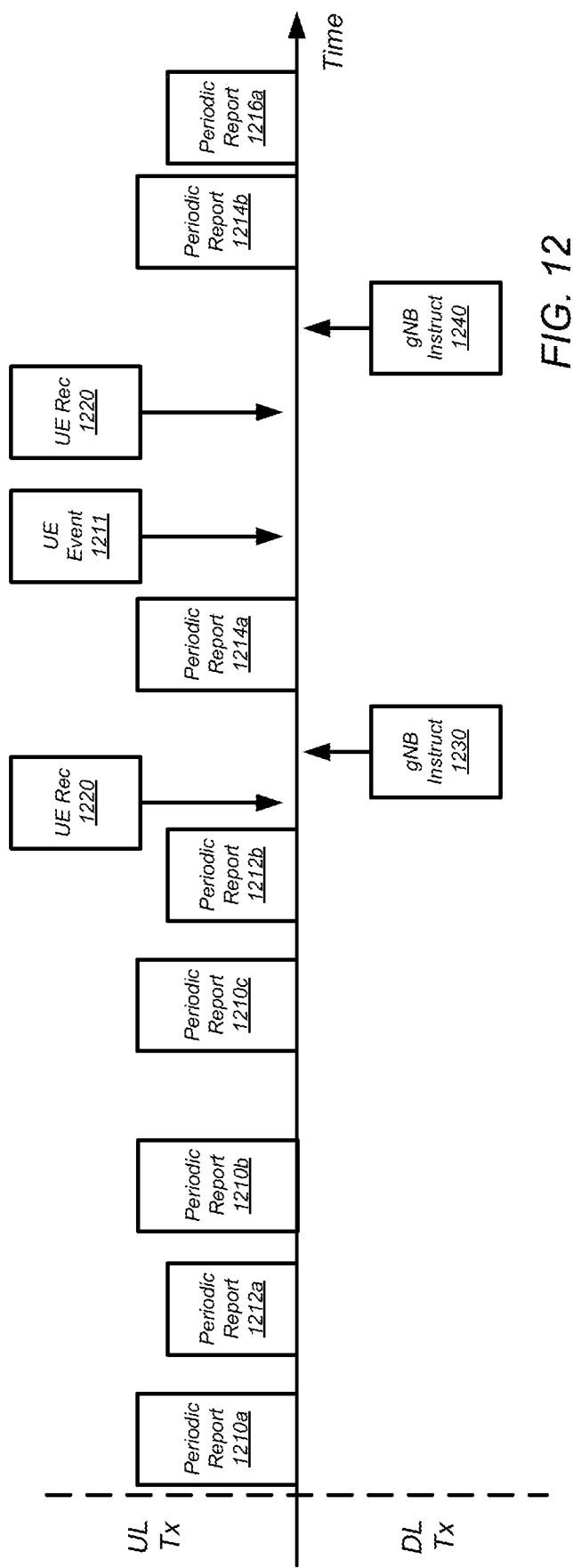
FIG. 12 illustrates an example of combined periodic and event-based beam management with UE feedback, according to some embodiments.

FIG. 12 illustrates signaling between a UE, such as UE 106, and a base station, such as gNB 102 (and/or gNB 604), for both periodic and event-based (e.g., aperiodic) beam quality reporting, according to some embodiments. As shown, the UE may transmit (on an uplink transmission) periodic beam quality reports for beam quality measurement references CSI-RS (e.g., reports 1210*a-c*) and SSB (e.g., reports 1212*a-b*) using periodic beam quality report configurations 1.b and 2.b, respectively. The UE may then recommend (e.g., via a MAC CE 1220) activating periodic beam quality report configurations 1.a and 2.a. In response, a base station, such as gNB 102 (and/or gNB 604), may determine (e.g., based, at least in part on the recommendation of the UE) to activate periodic beam quality report configurations 1.a and 2.a and deactivate periodic beam quality report configurations 1.b and 2.b, e.g., via a MAC CE 1230 transmitted to the UE on a downlink transmission and may transmit the indication of the activation and deactivation via the MAC CE 1230. Upon receiving the MAC CE 1230 from the base station, the UE may then transmit periodic beam quality reports for beam quality measurement references CSI-RS (e.g., reports 1214*a-b*) and SSB (e.g., report 1216*a*) using periodic beam quality report configurations 1.a and 2.a, respectively. In addition, the UE may transmit (on an uplink transmission) an event report 1211 via RRC signaling to the base station. The event report may optionally include recommended actions. After transmitting the event report 1211, the UE may transmit a recommendation 1220 to activate event beam quality report configuration 3, e.g., via a MAC CE. In response, the base station may determine (e.g., based, at least in part on the recommendation of the UE) to activate event beam quality report configuration 3 and may transmit an indication of the activation and deactivation via a MAC CE 1240.

In some embodiments, beam event transmission may be implemented via a MAC CE and/or via RRC signaling. In some embodiments, events may be specific to beam quality measurement references (e.g., CSI-RS and/or SSBs). In addition, a trend of L1-RSRP change (e.g., instantaneous, substantially instantaneous, and/or over a specified time period) may be considered an event. In some embodiments, events may include: (1) a strongest beam among a group of monitored beam pair links is better than (or exceeds) a threshold; (2) a strongest beam among a group of monitored beam pair links is worse than (or below) a threshold; (3) all monitored beam pair links become weaker than a threshold (may be considered a panic event); (4) neighbor beams are better than a threshold (TN) for a time-to-trigger (TTT) time where TN may be different between configured neighbor beam measurements based on CSI-RS and general beam measurements based on SSB and TTT may be different for different beam categories; (5) serving beam is worse than a first threshold (TH1) and a neighbor beam exceeds a second threshold (TH2) for a time hysteresis TTT (e.g., best beam switch, as discussed in more detail below); (6) serving beam quality continuously (or substantially continuously) reduces in last N1 configured measurement cycles with stepsize more than T1 and neighbor beam quality continuously (or substantially continuously) increases in the last N2 configured measurement cycles with stepsize more than T2 (e.g., bean quality change with trend detection, as discussed in more detail below); and/or (7) un-symmetric (e.g., not reciprocal) UL and DL beams (e.g., based on UL quality as observed at the UE, may include sounding reference failure, random access failure, a negative acknowledgment on a physical uplink shared channel (PUSCH), and/or real-time transport protocol loss on UL).

For example, in some embodiments, an event may include a best beam switch in which a serving beam is worse than a first threshold (TH1) and a neighbor beam exceeds a second threshold (TH2) for a time hysteresis TTT. In some embodiments, neighbor beams may include beams configured by a base station, such as gNB 102, for a UE, such as UE 106, to monitor on CSI-RS. In some embodiments, neighbor beams may (also) include beams from SSB measurement which may not be mandatory for the UE to measure. In some embodiments, TH2 and TTT may be different for beams configured by the base station for the UE to monitor on CSI-RS and for beams based on SSB measurement. Note that, in general, TH2 may be higher and TTT longer for beams based on SSB measurement as compared to beams based on CSI-RS measurement.

As another example, an event may include a beam quality change with trend detection in which a serving beam quality continuously (or substantially continuously) reduces in last N1 configured measurement cycles with stepsize more than T1 and neighbor beam quality continuously (or substantially continuously) increases in the last N2 configured measurement cycles with stepsize more than T2. Note that in some embodiments, T1 and T2 may be the same (or different) and similarly, N1 and N2 may be the same (or different). In some embodiments, the event may be considered multiple events, e.g., a first event may be the service beam reducing and a second event may be a neighbor beam improving. In some embodiments, the purpose of the trend detection may be to trigger early beam handover, thus N1 time measurement periodicity may be substantially less than the TTT in the best beam switch event described above. Note that the event may be combined with the best beam event with separate beam quality measurement configurations, in some embodiments.

Figure 13:
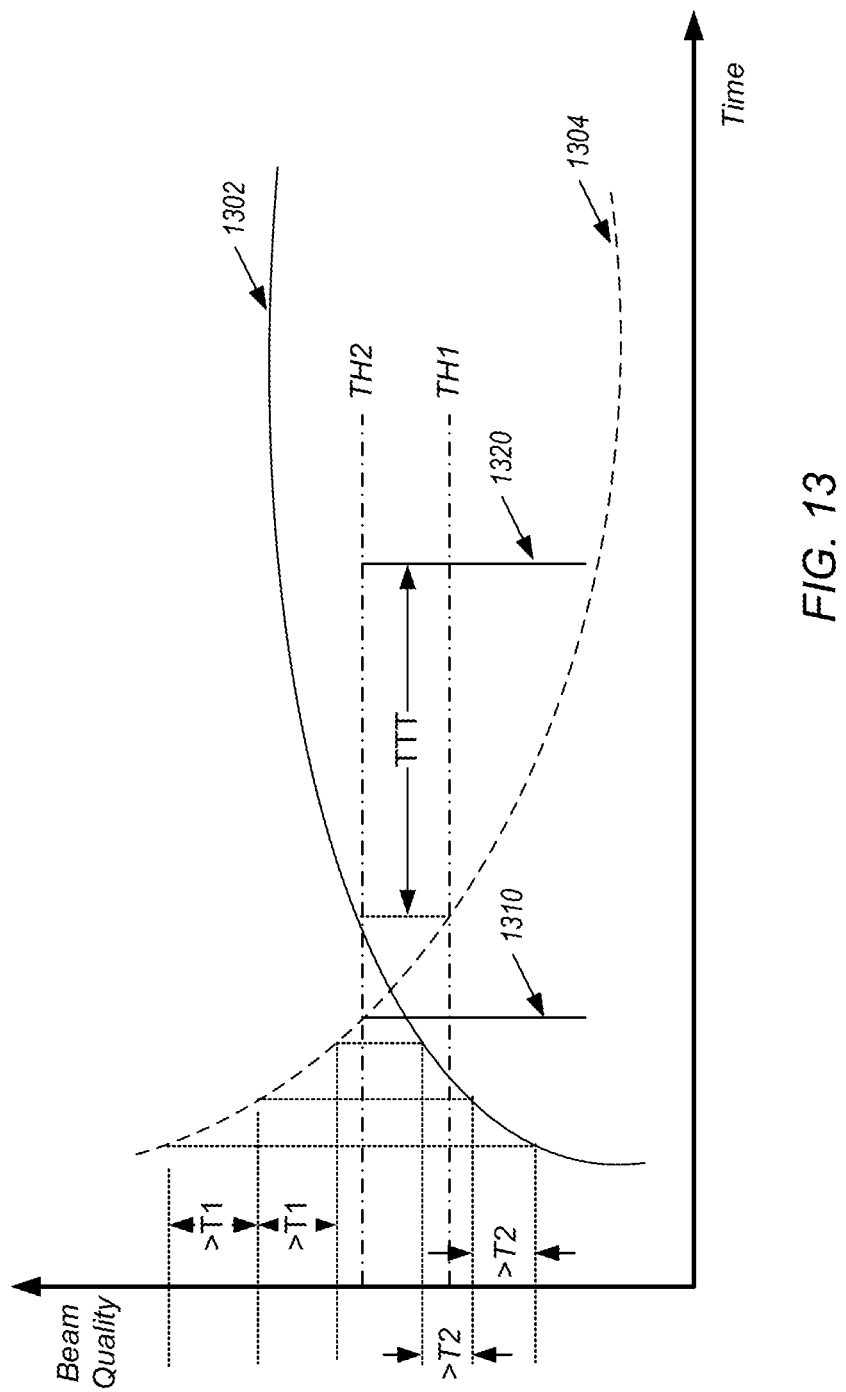
FIG. 13 illustrates examples of beam event detection, according to some embodiments.

For example, FIG. 13 illustrates beam event detections, according to some embodiments. As shown, a current beam 1304 may be rapidly degrading at a first point in time and slowly degrading at second point in time. Further, a neighbor beam 1302 may be rapidly improving at the first point in time and slowly improving at the second point in time. Thus, at the second point in time, a best beam switch event 1320 may aid in detection and resolution of a slow beam change with large variation, e.g., as illustrated by the differences in beam quality of beams 1302 and 1304. Note that in such an event, a time to trigger may delay the switch form beam 1304 to 1302 for a period of time after the beam 1302 has exceeded threshold TH2 and beam 1304 has dropped below threshold TH1. However, the best beam switch event 1320 may not be ideal for rapid beam change with smaller variation. Thus, a beam quality change with trend detection event 1310 may aid in detection and resolution of a fast beam change with lower variation, e.g., due to UE mobility. Note that in such an event, rapid degradation (e.g., greater than T1) in beam quality of beam 1304 may be detected at multiple points in time and may correspond to rapid increase (e.g., greater than T2) in beam quality of beam 1302 at the same points in time, thereby triggering event 1310.

Figure 14:
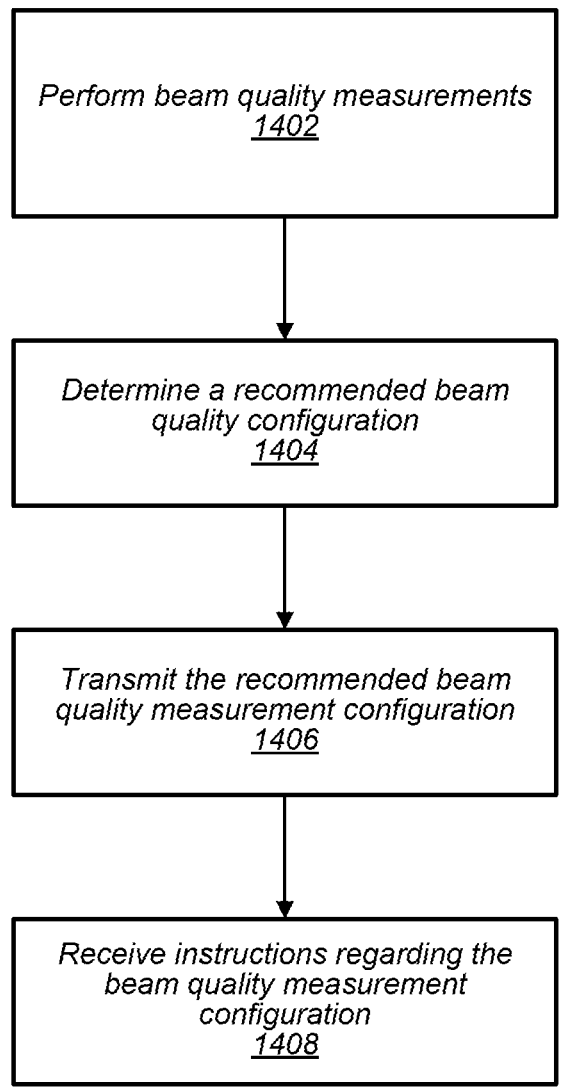
FIG. 14 illustrates a block diagram of an example of a method for beam quality management, according to some embodiments.

FIG. 14 illustrates a block diagram of an example of a method for beam quality management, according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1402, a user equipment device, such as UE 106 (or circuitry of a UE, such as cellular communication circuitry 330), may perform beam quality measurements. The beam quality measurements may be performed according to one or more beam quality measurement configurations. In some embodiments, the beam quality measurements may use (or be performed with respect to) one or more reference signals (RSs) received from a base station, such as gNB 102/604, serving the UE. The reference signals may be based, at least in part, on a channel state information (CSI) (e.g., the reference signals may include periodic CSI-RS (P-CSI-RS) and/or semi-persistent CSI-RS (SP-CSI-RS)) and/or synchronization signal blocks (SSBs), among other types of reference symbols. In some embodiments, the beam quality measurements may be performed periodically and/or may be performed responsive to an event (e.g., aperiodically). In other words, the UE may periodically perform beam quality measurements and/or the UE may perform event-based beam quality measurements. In some embodiments, an event triggering performance of event-based beam quality measurements may include any of a detection (by the UE or circuitry of the UE) of a strongest beam among a group of monitored beam pair links exceeding a threshold, a detection (by the UE or circuitry of the UE) of a strongest beam among a group of monitored beam pair links is dropping below a threshold, a detection (by the UE or circuitry of the UE) of all monitored beam pair links becoming weaker than a threshold, a detection (by the UE or circuitry of the UE) of neighbor beams that are better than a threshold (TN) for TTT time, a detection (by the UE or circuitry of the UE) of a serving beam being worse than a first threshold (TH1) and a neighbor beam exceeding a second threshold (TH2) for a time hysteresis TTT, a detection (by the UE or circuitry of the UE) of a serving beam quality continuously (or substantially continuously) reducing in last N1 configured measurement cycles with stepsize more than T1 and neighbor beam quality continuously (or substantially continuously) increasing in the last N2 configured measurement cycles with stepsize more than T2, and/or a detection (by the UE or circuitry of the UE) of un-symmetric (e.g., not reciprocal) UL and DL beams based on UL quality as observed at the UE.

At 1404, the UE (or circuitry of the UE) may determine, based at least in part on the beam quality measurements, a recommended beam quality measurement configuration. In some embodiments, the recommended beam quality measurement configuration may be further based (or alternatively based), at least in part, on conditions at the UE. In other words, the recommended beam quality measurement configuration may be based, at least in part, on environmental conditions measured by (or at) the UE (and/or fed back to circuitry of the UE, e.g., via motion sensors included on the UE). For example, conditions relevant to beam quality management may include any of a detected Doppler shift, a change in Doppler spread, motion detection, rotation detection, change of layer 1 reference signal received power (L1-RSRP), a trend in the change of L1-RSRP, and/or detection of blockage of at least one antenna of the UE. In some embodiments, recommended beam quality measurement configuration may include one of a periodic measurement configuration index and/or a set of measurement parameters associated with the recommended beam quality measurement configuration.

At 1406, the UE (or circuitry of the UE) may transmit, to the base station serving the UE, the recommended beam quality measurement configuration. In some embodiments, the UE may transmit the recommended beam quality measurement configuration via a medium access control (MAC) control element (CE). In some embodiments, the UE may transmit the recommended beam quality measurement configuration via a radio resource control (RRC) message. In some embodiments, the UE may transmit the recommended beam quality measurement configuration via a short format (e.g., according to 5G NR RAT) physical uplink control channel (PUCCH) frame or subframe.

At 1408, the UE may receive, from the base station, instructions regarding the beam quality measurement configuration. In some embodiments, the instructions regarding beam quality measurement configuration, may be based, at least in part, on the recommendation received from the UE. In some embodiments, the instructions may include activation of at least one beam quality measurement configuration, deactivation of at least one beam quality measurement configuration, and/or modification of at least one beam quality measurement configuration.

Figure 15:
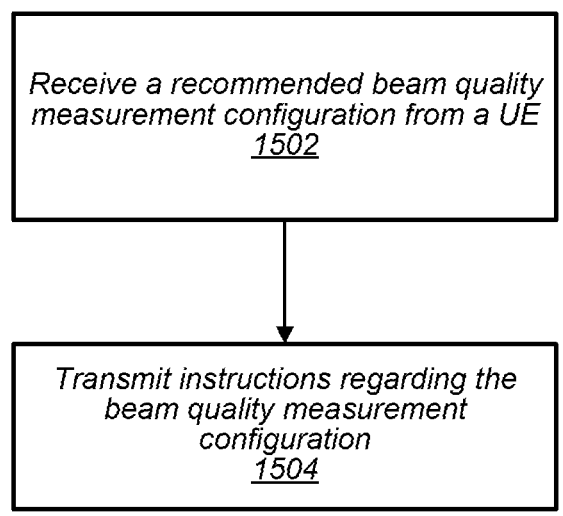
FIG. 15 illustrates a block diagram of another example of a method for beam quality management, according to some embodiments.

FIG. 15 illustrates a block diagram of another example of a method for beam quality management, according to some embodiments. The method shown in FIG. 15 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1502, a base station, such as gNB 102/604, may receive a recommended beam quality measurement configuration from a user equipment device, such as UE 106, served by the base station. The recommended beam quality measurement configuration may be based, at least in part, on beam quality measurements performed by the UE. In some embodiments, the UE may perform the beam quality measurements according to one or more beam quality measurement configurations. In some embodiments, the beam quality measurements may use (or be performed with respect to) one or more reference signals (RSs) transmitted to the UE by the base station. The reference signals may be based, at least in part, on a channel state information (CSI) (e.g., the reference signals may include periodic CSI-RS (P-CSI-RS) and/or semi-persistent CSI-RS (SP-CSI-RS)) and/or synchronization signal blocks (SSBs), among other types of reference symbols. In some embodiments, the beam quality measurements may be performed periodically and/or may be performed responsive to an event (e.g., aperiodically). In other words, the UE may periodically perform beam quality measurements and/or the UE may perform event-based beam quality measurements. In some embodiments, an event triggering performance of event-based beam quality measurements may include any of a detection (by the UE or circuitry of the UE) of a strongest beam among a group of monitored beam pair links exceeding a threshold, a detection (by the UE or circuitry of the UE) of a strongest beam among a group of monitored beam pair links is dropping below a threshold, a detection (by the UE or circuitry of the UE) of all monitored beam pair links becoming weaker than a threshold, a detection (by the UE or circuitry of the UE) of neighbor beams that are better than a threshold (TN) for TTT time, a detection (by the UE or circuitry of the UE) of a serving beam being worse than a first threshold (TH1) and a neighbor beam exceeding a second threshold (TH2) for a time hysteresis TTT, a detection (by the UE or circuitry of the UE) of a serving beam quality continuously (or substantially continuously) reducing in the last N1 configured measurement cycles with stepsize more than T1 and neighbor beam quality continuously (or substantially continuously) increasing in the last N2 configured measurement cycles with stepsize more than T2, and/or a detection (by the UE or circuitry of the UE) of un-symmetric (e.g., not reciprocal) UL and DL beams based on UL quality as observed at the UE.

In some embodiments, the recommended beam quality measurement configuration may be further based (or alternatively based), at least in part, on conditions at the UE. In other words, the recommended beam quality measurement configuration may be based, at least in part, on environmental conditions measured by (or at) the UE (and/or fed back to circuitry of the UE, e.g., via motion sensors included on the UE). For example, conditions relevant to beam quality management may include any of a detected Doppler shift, a change in Doppler spread, motion detection, rotation detection, change of layer 1 reference signal received power (L1-RSRP), a trend in the change of L1-RSRP, and/or detection of blockage of at least one antenna of the UE. In some embodiments, recommended beam quality measurement configuration may include one of a periodic measurement configuration index and/or a set of measurement parameters associated with the recommended beam quality measurement configuration.

In some embodiments, the recommended beam quality measurement configuration may be received via a medium access control (MAC) control element (CE). In some embodiments, the recommended beam quality measurement configuration may be received via a radio resource control (RRC) message. In some embodiments, the recommended beam quality measurement configuration may be received via a short format (e.g., according to 5G NR RAT) physical uplink control channel (PUCCH) frame or subframe.

At 1504, the base station may transmit to the UE instructions regarding the beam quality measurement configuration. In some embodiments, the instructions regarding beam quality measurement configuration, may be based, at least in part, on the recommendation received from the UE. In some embodiments, the instructions may include activation of at least one beam quality measurement configuration, deactivation of at least one beam quality measurement configuration, and/or modification of at least one beam quality measurement configuration.

Further Embodiments

In some embodiments, a user equipment device (UE) (or a baseband processor, processor, integrated circuit, and/or radio of the UE or an apparatus associated with the UE) may perform a method including:

performing one or more of periodic beam quality measurements and/or event-based beam quality measurements;

determining, based at least in part on one or more of the periodic beam quality measurements and/or the event-based beam quality measurements, a recommended beam quality measurement configuration;

transmitting, to a base station serving the UE, the recommended beam quality measurement configuration; and receiving, from the base station, instructions regarding the beam quality measurement configuration, wherein the instructions comprise first instructions to activate at least one beam quality measurement configuration, wherein the instructions are based, at least in part, on the recommended beam quality measurement configuration.

In some embodiments, the instructions may further comprise second instructions to deactivate at least one beam quality measurement configuration. In some embodiments, the instructions may further comprise third instructions to modify at least one beam quality measurement configuration.

In some embodiments, performing the one or more of periodic beam quality measurements and/or event-based beam quality measurements may be with respect to CSI-RS and/or SSBs.

In some embodiments, determining the recommended beam quality measurement configuration may be further based, at least in part on conditions at the UE. In some embodiments, the conditions may include at least one of (and/or any or all of, and/or any combination of):

Doppler shift; Doppler spread;
motion detection;
rotation detection;
change of L1-RSRP;
trend of L1-RSRP; and/or
blockage of antenna of the UE.

In some embodiments, the transmitting the recommended beam quality measurement configuration may include transmitting the recommended beam quality measurement configuration via a MAC CE, a short PUCCH, and/or an RRC message.

In some embodiments, the performing the one or more of periodic beam quality measurements and/or event-based beam quality measurements may be responsive to detection of an event. In some embodiments, the event may comprise at least one of (and/or any or all of, and/or any combination of):

detection of a strongest beam among a group of monitored beam pair links exceeding a threshold;

detection of a strongest beam among a group of monitored beam pair links is dropping below a threshold;

detection of all monitored beam pair links becoming weaker than a threshold;

detection of neighbor beams that are better than a threshold (TN) for TTT time;

detection of a serving beam being worse than a first threshold (TH1) and a neighbor beam exceeding a second threshold (TH2) for a time hysteresis TTT;

detection of a serving beam quality continuously (or substantially continuously) reducing in last N1 configured measurement cycles with stepsize more than T1 and neighbor beam quality continuously (or substantially continuously) increasing in the last N2 configured measurement cycles with stepsize more than T2; and/or detection of un-symmetric UL and DL beams based on UL quality as observed at the UE.

In some embodiments, the recommended beam quality measurement configuration may comprise one of (and/or any or all of, and/or any combination of):

a periodic measurement configuration index; and/or a set of measurement parameters associated with the recommended beam quality measurement configuration.

In some embodiments, a base station (or a baseband processor, processor, integrated circuit, and/or radio of the base station or an apparatus associated with the base station) may perform a method including:

receiving, from a user equipment device (UE) served by the base station, a recommended beam quality measurement configuration, wherein the recommended beam quality measurement configuration is based at least in part on one or more of the periodic beam quality measurements and/or the event-based beam quality measurements performed by the UE; and transmitting, to the UE, instructions regarding the beam quality measurement configuration, wherein the instructions comprise first instructions to activate at least one beam quality measurement configuration, wherein the instructions are based, at least in part, on the recommended beam quality measurement configuration.

In some embodiments, the instructions may further comprise second instructions to deactivate at least one beam quality measurement configuration. In some embodiments, the instructions may further comprise third instructions to modify at least one beam quality measurement configuration. In some embodiments, the beam quality measurements may be with respect to CSI-RS and/or SSBs.

In some embodiments, the recommendation may be further based, at least in part on conditions at the UE. In some embodiments, the conditions may comprise at least one of (and/or any or all of, and/or any combination of):

Doppler shift;
Doppler spread;
motion detection;
rotation detection;
change of L1-RSRP;
trend of L1-RSRP; and/or
blockage of antenna of the UE.

In some embodiments, the receiving the recommended beam quality measurement configuration may include receiving the recommended beam quality measurement configuration via a MAC CE, a short PUCCH, and/or RRC message.

In some embodiments, the recommended beam quality measurement configuration may comprise one of (and/or any or all of, and/or any combination of):

a periodic measurement configuration index; and a set of measurement parameters associated with the recommended beam quality measurement configuration.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors are configured to cause the UE to:
perform one or more beam quality measurements;
transmit, to a base station serving the UE, a recommended beam quality measurement configuration, wherein the recommended beam quality measurement configuration is based, at least in part, on the one or more beam quality measurements; and
receive, from the base station, instructions regarding the recommended beam quality measurement configuration, wherein the instructions are based, at least in part, on the recommended beam quality measurement configuration.

2. The UE of claim 1,
wherein the instructions include instructions to modify at least one beam quality measurement configuration.

3. The UE of claim 1,
wherein the instructions include at least one instruction indicating activation or deactivation of at least one beam quality measurement configuration.

4. The UE of claim 1,
wherein the one or more beam quality measurements are with respect to at least one of:
channel state information reference signals (CSI-RSs); and
synchronization signal blocks (SSBs).

5. The UE of claim 1,
wherein the recommended beam quality measurement configuration includes a recommended periodicity for a beam quality measurement reference.

6. The UE of claim 5,
wherein the recommended periodicity for the beam quality measurement reference is not selected from a candidate set received from the base station.

7. The UE of claim 1,
wherein determining the recommended beam quality measurement configuration is further based, at least in part, on conditions at the UE, and wherein the conditions comprise at least one of:
Doppler shift;
Doppler spread;
motion detection;
rotation detection;
change of L1-RSRP;
trend of L1-RSRP; or
blockage of antenna of the UE.

8. The UE of claim 1,
wherein, to transmit the recommended beam quality measurement configuration, the one or more processors are further configured to transmit the recommended beam quality measurement configuration via a medium access control (MAC) control element (CE), a short physical uplink control channel (PUCCH) message, or radio resource control (RRC) message.

9. The UE of claim 1,
wherein performing the one or more beam quality measurements is responsive to detection of an event, and wherein the event comprises at least one of:
detection of a strongest beam among a group of monitored beam pair links exceeding a threshold;
detection of the strongest beam among the group of monitored beam pair links is dropping below a threshold;
detection of all monitored beam pair links becoming weaker than the threshold;
detection of neighbor beams that are better than a threshold for a time-to-trigger (TTT) time;
detection of a serving beam being worse than a first threshold and a neighbor beam exceeding a second threshold for a time hysteresis TTT;
detection of a serving beam quality continuously reducing in a last first specified number of configured measurement cycles with stepsize more than the first threshold and neighbor beam quality continuously increasing in a last second specified number of configured measurement cycles with stepsize more than the second threshold; or
detection of un-symmetric uplink and downlink beams based on uplink quality as observed at the UE.

10. The UE of claim 1,
wherein the recommended beam quality measurement configuration comprises one of:
a periodic measurement configuration index; and
a set of measurement parameters associated with the recommended beam quality measurement configuration.

11. An apparatus, comprising:
a memory; and
a processor in communication with the memory, wherein the processor is configured to:
perform one or more beam quality measurements;
determine, based at least in part on the one or more beam quality measurements, a recommended beam quality measurement configuration;
generate instructions to transmit, to a base station serving a wireless device associated with the apparatus, the recommended beam quality measurement configuration; and
receive, from the base station, instructions regarding the beam quality measurement configuration, wherein the instructions are based, at least in part, on the recommended beam quality measurement configuration.

12. The apparatus of claim 11,
wherein the one or more beam quality measurements comprise at least one of a periodic beam quality measurement and an event based beam quality measurement.

13. The apparatus of claim 11,
wherein the instructions include instructions to modify at least one beam quality measurement configuration.

14. The apparatus of claim 11,
wherein the one or more beam quality measurements are with respect to at least one of:
channel state information reference signals (CSI-RSs); and
synchronization signal blocks (SSBs).

15. The apparatus of claim 11,
wherein the recommended beam quality measurement configuration includes a recommended periodicity for a beam quality measurement reference, and wherein the recommended periodicity for the beam quality measurement reference is not selected from a candidate set received from the base station.

16. The apparatus of claim 11,
wherein, to generate instructions to transmit the recommended beam quality measurement configuration, the processor is further configured to generate instructions to transmit the recommended beam quality measurement configuration via a medium access control (MAC) control element (CE), a short physical uplink control channel (PUCCH) message, or radio resource control (RRC) message.

17. A non-transitory computer readable memory medium storing program instructions executable by processing circuitry to cause a user equipment device (UE) to:
perform one or more beam quality measurements;
generate instructions to transmit, to a base station serving the UE, a recommended beam quality measurement configuration, wherein the recommended beam quality measurement configuration is based, at least in part, on the one or more beam quality measurements; and
receive, from the base station, instructions regarding the recommended beam quality measurement configuration, wherein the instructions are based, at least in part, on the recommended beam quality measurement configuration.

18. The non-transitory computer readable memory medium of claim 17,
wherein the instructions include instructions to modify at least one beam quality measurement configuration.

19. The non-transitory computer readable memory medium of claim 17, wherein the recommended beam quality measurement configuration includes a recommended periodicity for a beam quality measurement reference.

20. The non-transitory computer readable memory medium of claim 17,
wherein the one or more beam quality measurements comprise at least one of a periodic beam quality measurement and an event based beam quality measurement.

* * * * *